(12) United States Patent
Miller et al.

(10) Patent No.: US 8,101,881 B2
(45) Date of Patent: Jan. 24, 2012

(54) ARC RESISTANT SWITCHGEAR VERTICAL EXHAUST SYSTEM

(75) Inventors: Michael Miller, Cedar Rapids, IA (US); Abraham de la Cruz, Smyrna, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 470 days.

(21) Appl. No.: 12/420,337

(22) Filed: Apr. 8, 2009

(65) Prior Publication Data

US 2010/0258532 A1 Oct. 14, 2010

(51) Int. Cl.
*H01H 33/02* (2006.01)

(52) U.S. Cl. ......... 218/157; 361/724; 361/679; 361/608

(58) Field of Classification Search .................. 218/157; 361/724, 679, 608

See application file for complete search history.

(56) References Cited

U.S. PATENT DOCUMENTS

| | | | |
|---|---|---|---|
| 5,193,049 A * | 3/1993 | Jackson | 361/676 |
| 5,457,296 A | 10/1995 | Neill et al. | |
| 5,570,740 A * | 11/1996 | Flores et al. | 165/104.34 |
| 5,574,624 A | 11/1996 | Rennie et al. | |
| 5,689,097 A | 11/1997 | Aufermann et al. | |
| 5,710,402 A | 1/1998 | Karnbach et al. | |
| 5,767,440 A | 6/1998 | Byron et al. | |
| 5,878,905 A | 3/1999 | Gronbach et al. | |
| 5,892,195 A | 4/1999 | Aufermann et al. | |
| 6,127,663 A * | 10/2000 | Jones | 219/553 |
| 6,407,331 B1 | 6/2002 | Smith et al. | |
| 6,417,443 B1 | 7/2002 | Smith | |
| 7,236,352 B2 * | 6/2007 | Dalis | 361/608 |
| 7,319,594 B2 * | 1/2008 | Nicolai et al. | 361/724 |

* cited by examiner

*Primary Examiner* — Truc Nguyen

(57) ABSTRACT

An exhaust system for exhausting gases and molten debris caused by an electric arc within a switchgear. The exhaust system includes a switchgear having lower and upper compartments and an exhaust unit externally mounted to the switchgear. A wall panel of the switchgear includes blow out panels coinciding with openings in the lower compartment and corresponding ventilation flaps in a top surface of the exhaust unit to exhaust gas from the lower compartment out the blow out panels in a vertical direction, exiting through the flaps. The upper compartment includes ventilation flaps for exhausting gas in a vertical direction directly through the flaps and optionally through side-mounted blow out panels that communicate with the vertical vent path to the flaps in the top of the exhaust unit. A bus compartment in the exhaust unit includes a vent path to flaps in the top of the exhaust unit for exhausting gas produced by bus arcing.

19 Claims, 5 Drawing Sheets

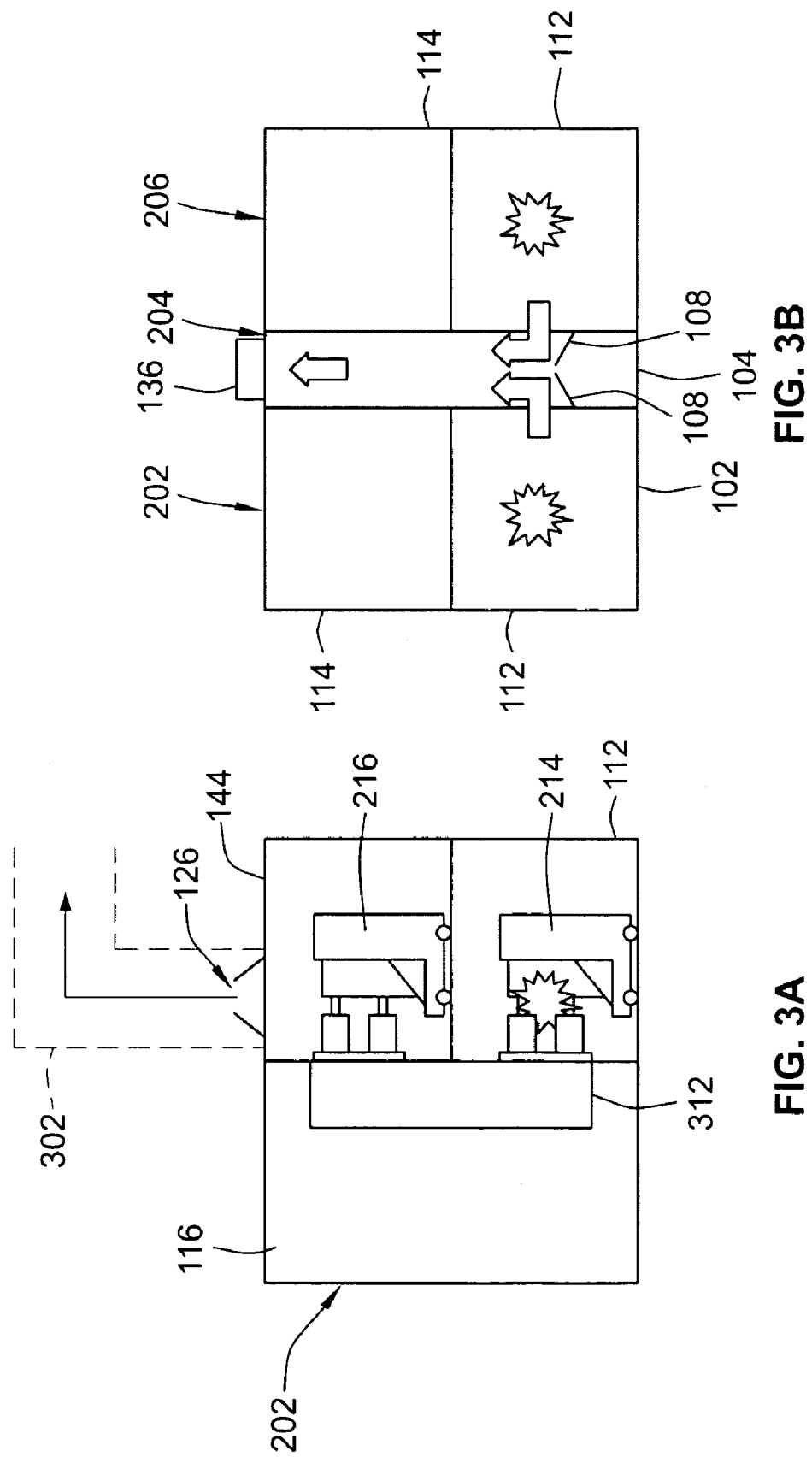

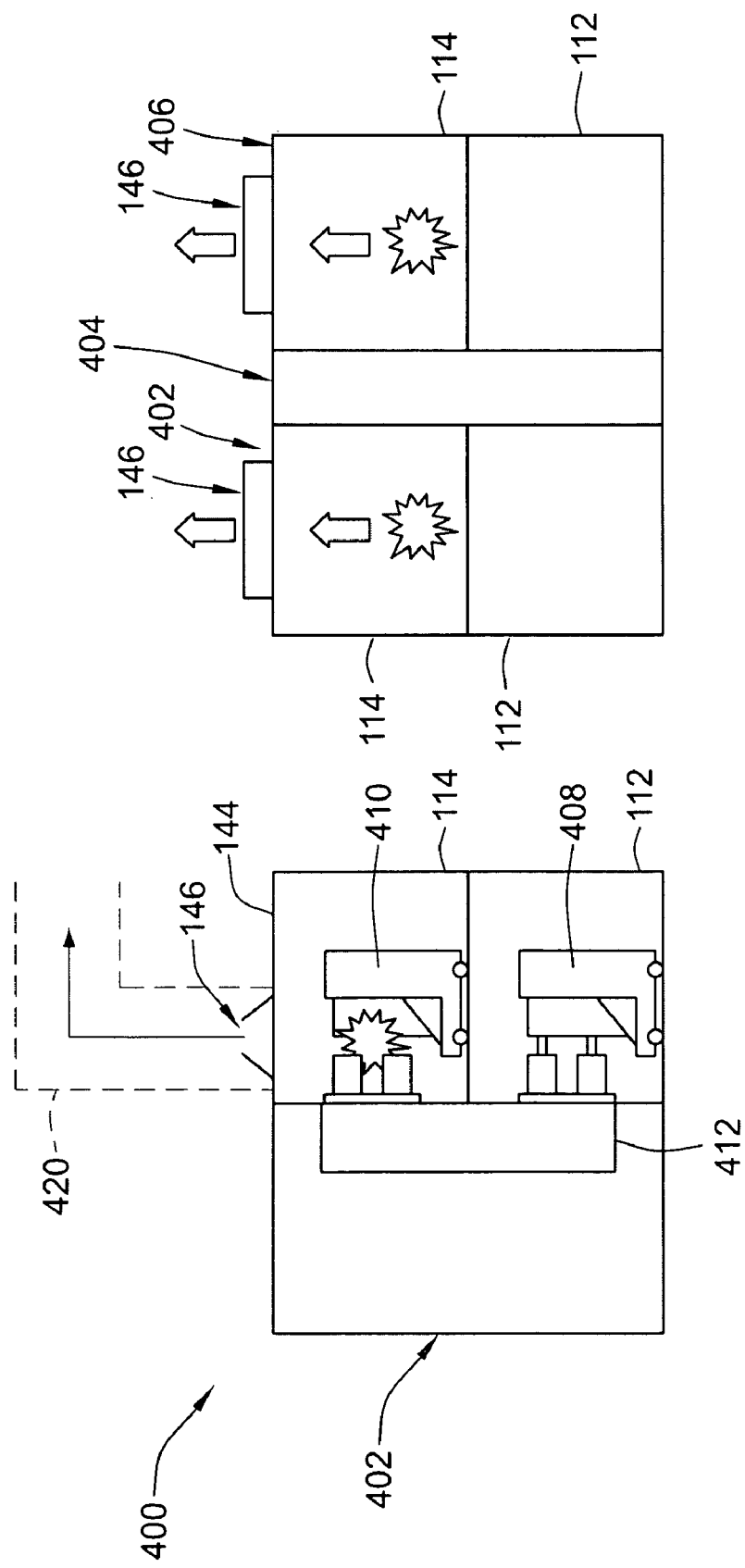

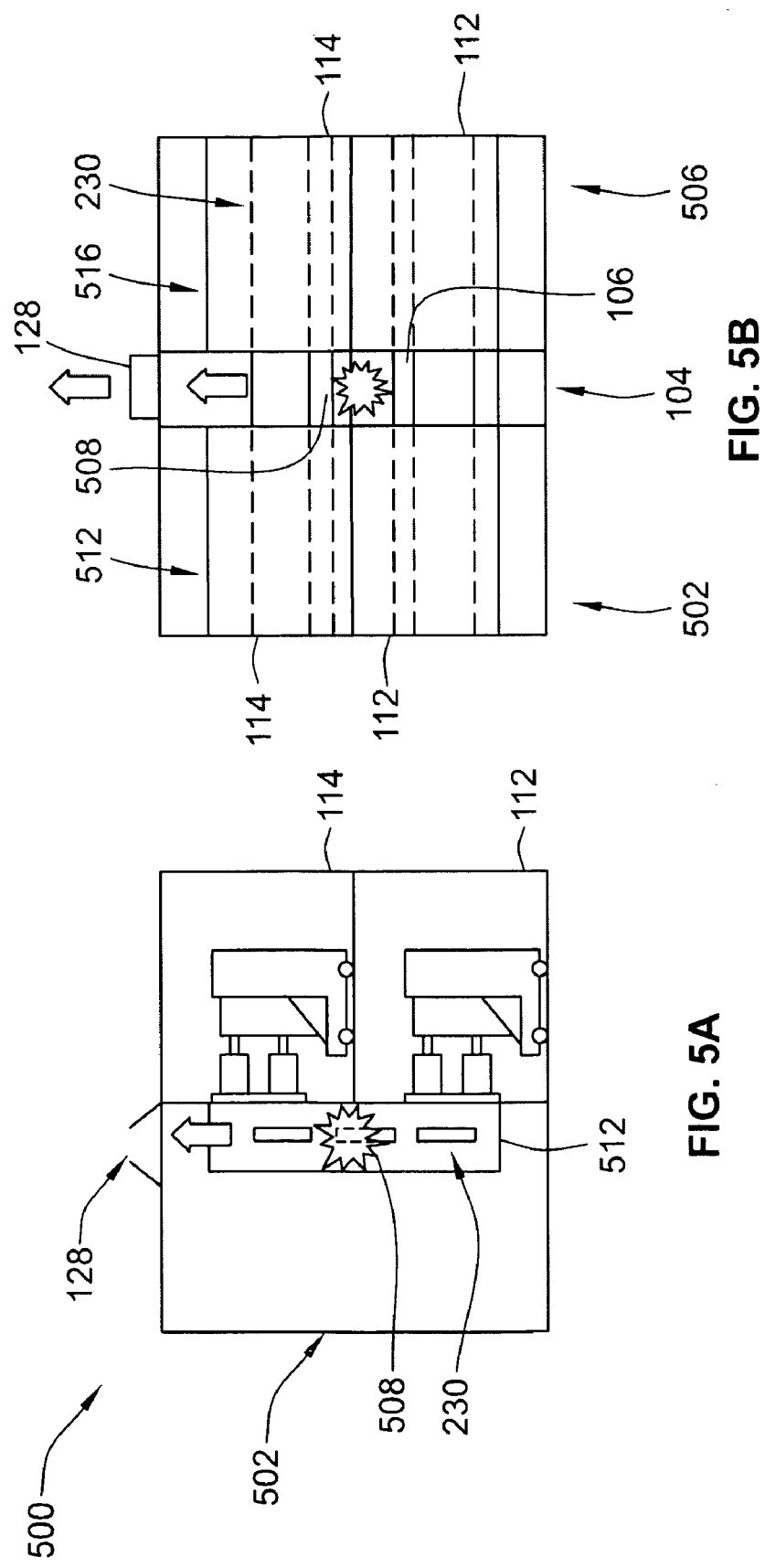

ARC RESISTANT SWITCHGEAR VERTICAL EXHAUST SYSTEM

FIELD OF THE INVENTION

This disclosure relates generally to switchgear, and, more particularly, to a vertical exhaust system for arc-resistant switchgear.

BACKGROUND

Medium voltage (MV) switchgear can include an exhaust system for venting gas and debris particles generated by an electric arc under arc-fault conditions. During an arc fault explosion, temperature and pressure inside the switchgear increase very rapidly, and the rapid pressure build-up can damage the switchgear and its components. In certain environments, vertically stacked breakers, such as 2-high breaker units are commonly employed. These vertically stacked units have an upper and a lower compartment, each for receiving a circuit breaker or current/voltage transformer. Prior solutions have proposed internal arc chambers located within the switchgear for venting gas and debris from the lower compartment through the roof or top of the switchgear enclosure. The sudden, high temperature and pressure created by an exploding arc can damage numerous internal components of the switchgear as the gas and debris escape through the top vents of the switchgear enclosure. Moreover, the internal arc chambers in some prior exhaust systems have a horizontal internal chamber that communicates with a vertical internal chamber, such that if the sudden pressure created by an electric arc is not immediately relieved by the top vents, one or both of the sides of the switchgear enclosure terminating the horizontal internal chamber can blow out, venting hot gases and debris out the side of the switchgear enclosure and endangering a human standing nearby. An arc fault can also occur on the busbar conductors that run inside of a switchgear unit. Attempts have been made to exhaust gas caused by arcs on the busbars, but such designs are complicated and expensive to implement.

What is needed is a vertical exhaust system for an arc-resistant switchgear. Aspects and embodiments disclosed herein are directed to addressing/solving these and other needs.

BRIEF SUMMARY

Metal-clad switchgear under arc fault conditions requires an enhanced level of protection. Under such conditions, gas and particles are generated internally by an electric arc. This arc fault can be the result of a dielectric breakdown, atmospheric conditions, or external effects. The arc fault produces a sudden liberation of energy in the form of an electric arc and produces gases and molten metal particles. Temperature and pressure increase suddenly and rapidly. The pressure buildup can cause damage to the switchgear and nearby bystanders. This invention allows the release of arc gases in a controlled manner that protects bystanders from injury and insulates other switchgear from damage.

An externally mounted exhaust unit is proposed to provide vertical vent paths for the gases and molten debris produced by an electric arc within the switchgear and within the bus compartment within the switchgear. The exhaust unit is secured to the exterior sides of one or two adjoining switchgear units for providing a vertical vent path for explosions that occur in either the upper or lower compartments of the switchgear or in the bus compartment. Side-mounted blow out panels are provided in the exhaust unit that coincide with openings in the lower compartment. Vertical ventilation flaps are provided in the top surface of the exhaust unit to allow gas and debris to be exhausted out of the top of the exhaust unit. A bus compartment in the exhaust unit receives busbar conductors and exhausts gas and debris produced by an electric arc within the bus compartment out of the top of the exhaust unit through ventilation flaps. Ventilation flaps on the top of the upper compartment of the switchgear unit exhaust gas and debris produced within the upper compartment directly out of the ventilation flaps. The exhaust unit provides a vertical path for all gas and debris internal to the switchgear unit to be exhausted out of the top of the exhaust unit. Switchgear that do not experience the electric arc are insulated from damage caused by the exhausted gas and debris, and operators standing nearby are less likely to be injured by gas or debris exploding out of the sides or front of the switchgear unit.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 3A is a side view of an exemplary exhaust system showing an electric arc in a lower compartment of the switchgear unit;

FIG. 3B is a front view of the exhaust system shown in FIG. 3A and the vent path taken by gas and debris generated in the lower compartment of the switchgear unit;

FIG. 4A is a side view of an exemplary exhaust system showing an electric arc in an upper compartment of the switchgear unit;

FIG. 4B is a front view of the exhaust system shown in FIG. 4A and the vent path taken by gas and debris generated in the upper compartment of the switchgear unit;

FIG. 5A is a side view of an exemplary exhaust system showing an electric arc in a bus compartment of the switchgear unit or the exhaust unit; and FIG. 5B is a front view of the exhaust system shown in FIG. 5A and the vent path taken by gas and debris in the bus compartment of the exhaust unit.

DETAILED DESCRIPTION

Figure 1:
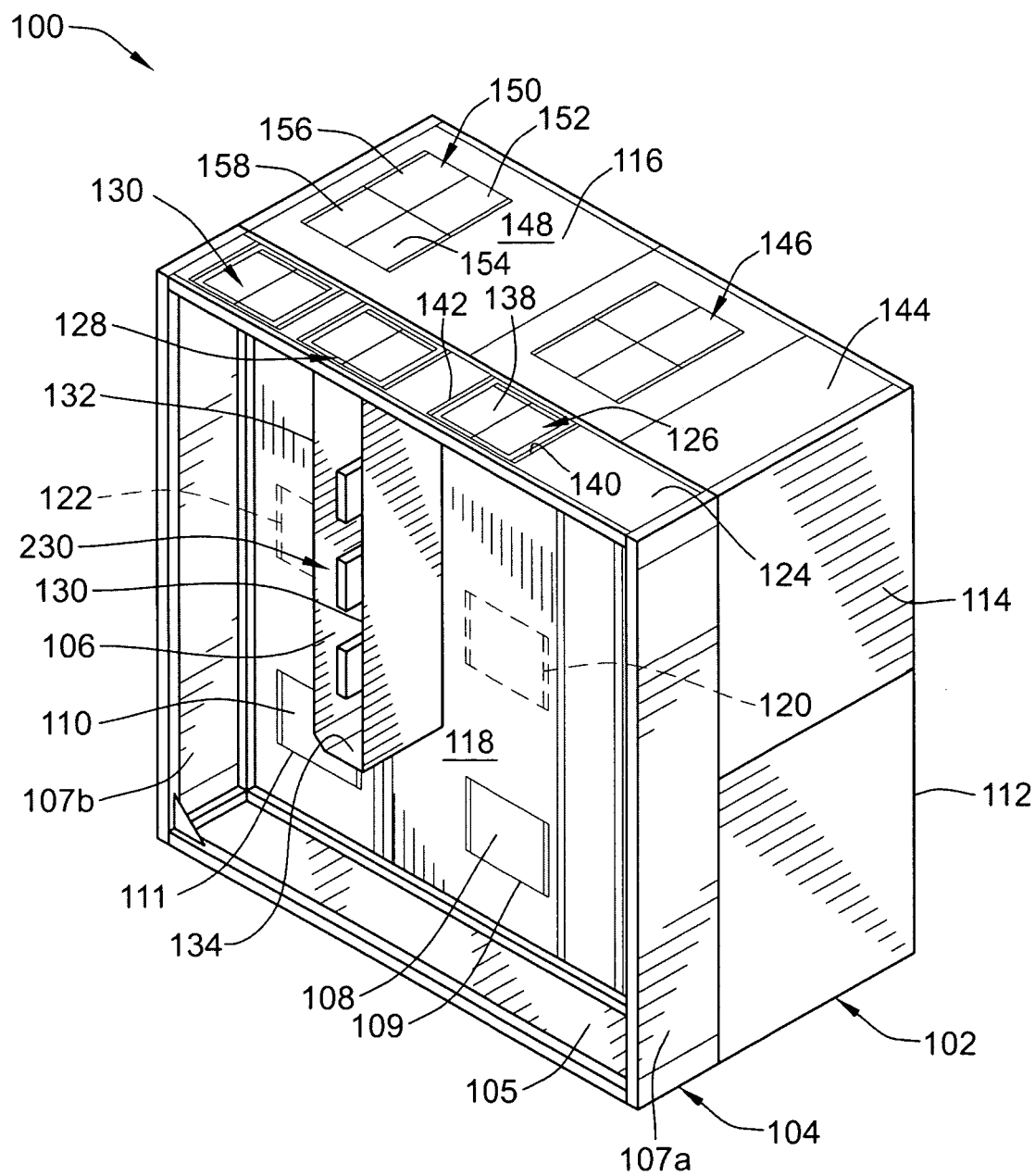
FIG. 1 is an isometric view of an exhaust system that includes a switchgear unit and an externally mounted exhaust unit.

An isometric view of an exhaust system 100 is shown in FIG. 1. The exhaust system 100 generally includes a switchgear unit 102 and an exhaust unit 104 that is attached to an exterior or major plane surface of the switchgear unit 102 by way of screws, rivets, welding, or the like. One side of the exhaust unit 104 has been revealed to expose a bus compartment 106 and a first lower blow out panel 108 and a second lower blow out panel 110 formed in a side wall panel 118 of the switchgear unit 102. A front section of the switchgear unit 102 includes a lower compartment 112 and an upper compartment 114 in a stacked, vertical relationship. A rear section of the switchgear unit 102 includes a rear or cable compartment 116, which typically houses cables. The bus compartment 106 is dimensioned to receive therewithin up to three busbar conductors carrying electrical current to a protection or measurement device disposed within the compartments 112, 114. The busbar conductors, shown in FIG. 2, extend across multiple switchgear units stacked side-by-side and extend through the bus compartment 106 of the exhaust unit 104 sandwiched between the respective exteriors of two switchgear units. Except for the busbar conductors, the exhaust unit 104 does not contain any switchgear equipment. The lower, upper, and rear compartments 112, 114, 116 are conventionally separated from one another by insulating barriers (not shown), which are typically made of metal.

As used herein, the term medium-voltage "switchgear" includes the definition provided by the American National Standards Institute (ANSI) C37.20.2. An example of a suitable metal-clad switchgear that can be adapted for use with the present invention includes the MASTERCLAD™ metal-clad indoor switchgear available from Square D Company based in Palatine, Ill. The term "medium voltage" or MV refers to voltages 600V or above and less than 38 kV. The METALCLAD™ switchgear has a voltage rating of approximately 5-15 kV. Low voltage as used herein refers to voltages below 600V. As used herein, the term "unit" indicates that the component or structure includes a housing that defines the component or structure as a unitary structure. An "enclosure" as used herein can include multiple units arranged together.

The lower and upper compartments 112, 114 house a variety of protection and measurement devices, including vacuum circuit breakers, control power transformers (CPTs), voltage transformers, and fuse protection devices. When an MV circuit breaker is housed within both of the lower and upper compartments 112, 114, the switchgear unit 102 is referred to as a "2-High" unit. When the upper compartment 112 is blank or houses equipment other than a circuit breaker, the switchgear unit 102 is referred to as a "1-High" unit. The lower and upper compartments 112, 114 are dimensioned to receive within each compartment an MV circuit breaker. The compartments 112, 114 are typically about 36 inches wide, 40 inches deep, and 40 inches high. The circuit breakers received within the compartments 112, 114 weigh up to 550 pounds. The exhaust unit 104 preferably has the same height and depth dimensions as the switchgear unit 102. The width of the exhaust unit 104 should be made as small as possible, to minimize the overall footprint of the exhaust system 100, but large enough to withstand the high temperature and pressure caused by an electric arc internal to the switchgear unit 102. In a non-limiting example, the exhaust unit 104 has a width of approximately 12 inches, and has the same depth and height as that of the switchgear unit 102. The exhaust unit 104 resembles a frame structure having a generally square or rectangular cross section, comprising a bottom base 105, two side walls 107a,b, and a top wall 124 that includes ventilation flap assemblies 126, 128, 130. It should be understood that the exhaust unit 104 has an interior volume that is physically distinct and separate from any interior compartment of the switchgear unit 102. Side walls 118 in the switchgear unit 102 separate it from the exhaust unit 104. The term "unit" means that there is a unitary structure, such as a frame or a housing, that encloses a device to form a unit. In this example, the exhaust unit 104 includes a frame that is not integral to the switchgear unit 102, which has its own associated frame and housing.

The first lower blow out panel 108 formed in the side wall 118 of the switchgear unit 102 coincides with an opening in the lower compartment 112 for venting gas and molten debris caused by an electric arc. The first lower blow out panel 108 is opened away from the lower compartment 112 and into the exhaust unit 104 in response to the sudden internal pressure inside the lower compartment 112 generated by an internal electric arc. The second lower blow out panel 110 formed in the side wall 118 of the switchgear unit 102 coincides with an opening in the rear compartment 116 for venting gas and molten debris caused by an electric arc. The second lower blow out panel 110 is opened away from the rear compartment 116 and into the exhaust unit 104 in response to the sudden internal pressure inside the rear compartment 116 generated by an internal electric arc. The blow out panels 108, 110 can be secured along respective bottom edges 109, 111 to the side wall 118 of the switchgear unit 102, such that the blow out panels 108, 110 hinge away from the respective compartments 112, 116 and into the exhaust unit 104 in response to an internal arc fault.

The exhaust unit 104 includes a top surface 124 that includes three ventilation flap assemblies 126, 128, 130 that open away from the top surface 124 in response to pressure within the exhaust unit 104 caused by an electric arc generated in one of the compartments 112, 114, 116 or in the bus compartment 106. The bus compartment 106 includes a pair of parallel vertical walls 130, 132 coupled to a base 134 such that the bus compartment 106 is generally U-shaped. The walls 130, 132 terminate at the ventilation flap assembly 128. Each of the ventilation flap assemblies 126, 128, 130 includes a pair of opposing flaps 136, 138 (shown on flap assembly 126 only in FIG. 1 for clarity) secured to the top surface 124 of the exhaust unit 104 at respective edges 140, 142 such that the opposing flaps 136, 138 each open away from one another and away from the interior of the exhaust unit 104 in response to internal pressure inside the exhaust unit 104. An optional vent hood 302 (shown in FIG. 3A) can be attached to cover any or all of the vent assemblies 126, 128, 130 to exhaust the gases and molten debris outside the room in which the exhaust system 100 is disposed or to the outdoors. When the exhaust system 100 is disposed outdoors, the gases and debris can be directed further away from the top of the switchgear unit 102. The optional vent hood 302 prevents gas and molten debris particles from raining back down on operators standing nearby.

A top surface 144 of the upper compartment 114 includes a ventilation flap assembly 146, and a top surface 148 of the rear compartment 116 includes a ventilation flap assembly 150. Because the pressure inside the upper compartment 114 or rear compartment 116 will be greater than the pressure present in the exhaust unit 104, additional flaps may be needed to ensure a sufficiently large opening to release the pressure internal to the upper or rear compartments 114, 116. To that end, the ventilation flap assemblies 148, 150 includes two pairs of opposing flaps 152, 154, 156, 158 (shown on flap assembly 150 only in FIG. 1 for clarity) that each open away from one another and away from the compartments 114, 116 in response to internal pressure generated by an electrical arc therein. Each of the flaps 152, 154, 156, 158 can be secured at their respective edges to the respective top surfaces 124, 148 of the upper and rear compartments 114, 116 so that the flaps 152-158 act as hinges to open away from the compartments 114, 116 and allow the hot gases and molten debris to be released out the top of the switchgear unit 102. An optional vent hood 420 (shown in FIG. 4A) can be attached to cover the vent assemblies 146, 150 to exhaust the gases and molten debris outside the room in which the exhaust system 100 is disposed or to the outdoors. When the exhaust system 100 is disposed outdoors, the gases and debris can be directed further away from the top of the switchgear unit 102. The optional vent hood 420 prevents gas and molten debris particles from raining back down on operators standing nearby.

Figure 2:
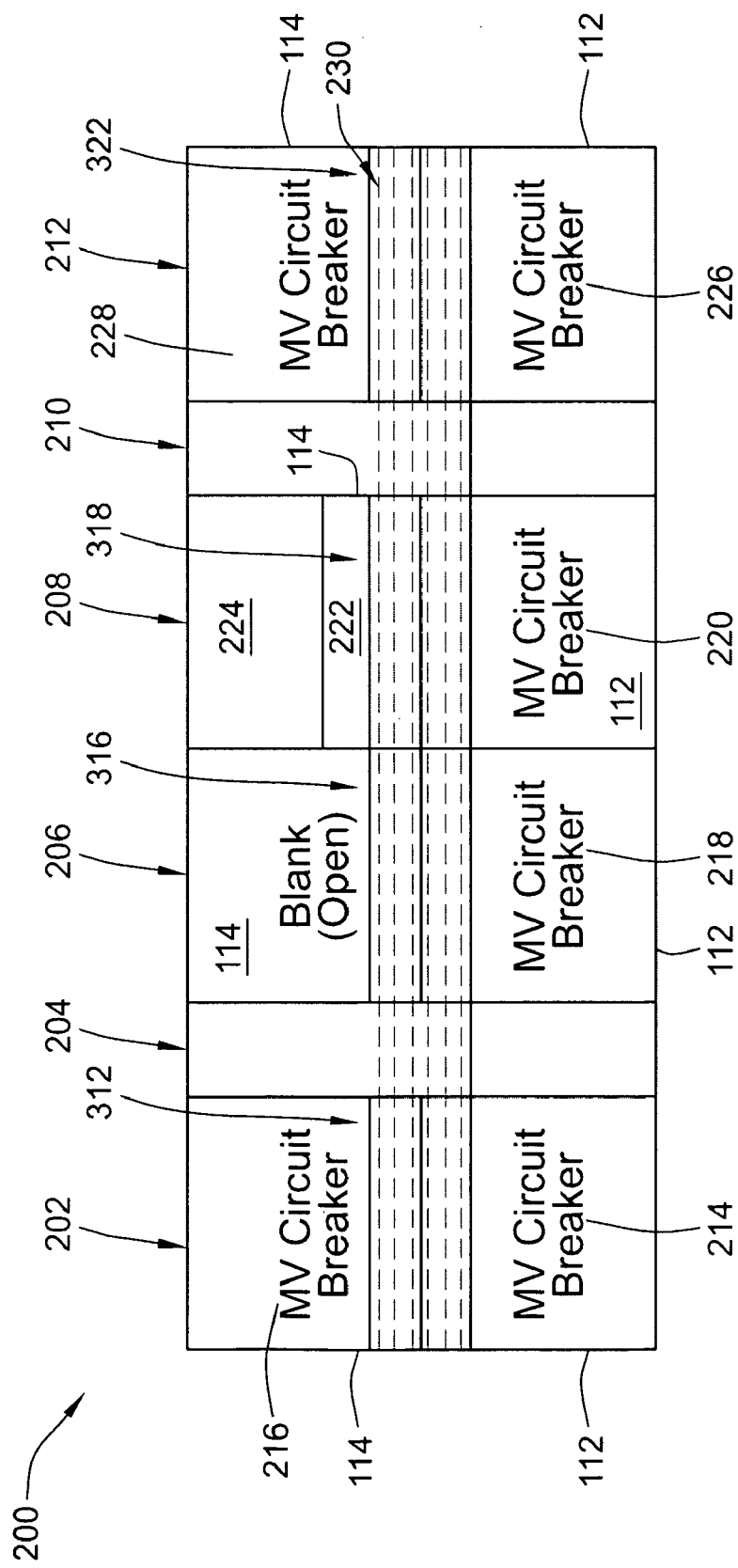
FIG. 2 is a front view of an exemplary switchgear lineup that includes an exhaust unit between every two adjacent switchgear units.

FIG. 2 illustrates an exemplary switchgear lineup 200 having two exhaust units 204, 210 flanked on either side by respective switchgear units 202, 206, 208, 212. The lineup 200 may house all of the units 202-212 in a common enclosure. Although four switchgear units 202, 206, 208, 212 are shown in this exemplary lineup 200, the exhaust system 100 shown in FIG. 1 can include only one switchgear unit or any even or odd number of switchgear units. In the case of an odd-number of switchgear units, the exposed side of the exhaust unit disposed at the end of the lineup is covered by a metal panel. An exhaust unit like the exhaust unit 104 shown and described in connection with FIG. 1 is disposed between every two consecutive switchgear units, forming a sort of plenum between adjacent switchgear units. Each of the switchgear units 202, 206, 208, 212 are like the switchgear unit 102 shown and described in connection with FIG. 1. Accordingly, the same reference numbers in FIG. 1 will be used to describe the same components in FIG. 2. In the example shown, the switchgear units are shown in various configurations. The switchgear unit 202 is a 2-High unit having a MV circuit breaker 214, 216 in the lower and upper compartments 112, 114 of the switchgear unit 202. The switchgear unit 206 is a 1-High unit having a single MV circuit breaker 218 in the lower compartment 112 only. The upper compartment 114 of the switchgear unit 206 is empty. The switchgear unit 208 includes a single MV circuit breaker 220 in the lower compartment 112, and two auxiliary compartments 222, 224 in the upper compartment 114. Finally, the switchgear unit 212, like the switchgear unit 202, has a MV circuit breaker 226 in the lower compartment 112 and a MV circuit breaker 228 in the upper compartment 114 to form a 2-High unit.

One or more busbar conductors 230 extend across all of the switchgear and exhaust units 202, 204, 206, 208, 210, 212 as shown. They are housed within corresponding bus compartments (see bus compartments 312, 412 in FIGS. 3A and 4A) in the switchgear and in the exhaust units 202, 204, 206, 208, 210, 212. Within each switchgear unit 202, 206, 208, 212, there is a conventional bus compartment 312, 316, 318, 322 (see also bus compartment 412) having an opening that abuts against the corresponding bus compartment 106 of the exhaust unit 104 (note, there is one exhaust unit 104 between every two switchgear units) such that when a switchgear unit 202, 206, 208, 212 is positioned adjacent the exhaust unit 104, the corresponding bus compartments 312, 316, 318, 322 in the switchgear unit 202, 206, 208, 212 are flush with or abut against the corresponding bus compartment 106 such that a continuous compartment is presented across the widths of the switchgear enclosure defined by the switchgear and exhaust units 202, 204, 206, 208, 210, 212. The busbar conductors 230 run through this common contiguous compartment. Advantageously, two switchgear units 202, 206 share one exhaust unit 204 such that gas caused by an electric arc relative to the busbar conductors 230 in either the switchgear units 202, 206 or in the exhaust unit 204 will exhaust out of the top vent assembly 128. This arrangement significantly simplifies the design of the overall exhaust system, because the exhaust unit 104 is designed and fabricated separately from the switchgear unit 102 and no modifications need to be made to existing switchgear to accommodate the bus compartment 106 in the exhaust unit 104. The exhaust unit 104 can simply be inserted between two adjacent switchgear units (e.g., 202, 204) and attached to the respective switchgear units with screws, bolts, or the like.

It should be noted that the bus compartments 312, 316, 318, 322 and the busbar conductors 320 shown in the figures are not drawn to scale. The size and position of these compartments and conductors are conventionally known. The bus compartment 106 of the exhaust unit 104 is designed such that the bus compartment 106 fits snugly in an abutting relationship against the corresponding bus compartments in adjacent switchgear units.

The lower compartments of the switchgear units 202, 206, 208, 212 include respective oppositely facing lower blow out panels like the lower blow out panels 108, 110 shown and described in connection with FIG. 1, and optional oppositely facing upper blow out panels like the optional upper blow panels 120, 122 shown and described in connection with FIG. 1. The exhaust units 204, 210 include corresponding ventilation flap assemblies like the ventilation flap assemblies 126, 128, 130 shown in FIG. 1. By disposing an exhaust unit every other switchgear unit (such that there is one exhaust unit for every two switchgear units), this arrangement advantageously insulates other nearby switchgear from damage during an internal arc fault in one switchgear. For example, an explosion in the lower compartment 112 of the switchgear unit 202 will leave the switchgear units 208 and 212 unscathed. Advantageously, no matter how long or short the lineup, all of the gas and debris regardless of where the arc fault occurs is directed in a vertical direction away from the sides of the respective switchgear units, eliminating or at a minimum significantly reducing the possibility that an arc fault will expel gas or debris out one of the side panels of the switchgear, causing injury to anyone standing nearby.

FIGS. 3A and 3B illustrate side and front views, respectively, of an exemplary switchgear lineup in which an explosion caused by an electric arc occurs in the lower compartments. Again, the same reference numbers found in FIG. 1 are used in FIGS. 3A and 3B to refer to identical components. In the FIG. 3A example, an arc fault in the MV circuit breaker 214 located in the lower compartment 112 of the switchgear unit 202. The arc fault generates gases and molten debris that suddenly and dramatically increases the pressure inside the lower compartment 112. The lower blow out panel 108 provides a path for the pressure, causing the gas and debris to be expelled in a direction out of the page (FIG. 3A) and vertically toward the ventilation flap assembly 126 located on the top surface 124 of the exhaust unit 204 (FIG. 3B). An electric arc present in the lower compartment 112 of the adjoining switchgear unit 206 also expels its gas and debris out of the lower blow out panel 108 and vertically toward the ventilation flap assembly 126. Note that some gas or debris may also be exhausted out of the ventilation flap assembly 130, depending upon the energy produced by the arc explosion.

FIGS. 4A and 4B are side and front views of an exemplary switchgear lineup 400 having an exhaust unit 404 sandwiched between a first switchgear unit 402 and a second switchgear unit 406. The same reference numbers found in FIG. 1 are used in FIGS. 4A and 4B to refer to identical components. In the lineup 400, both upper compartments 114 of the first and second switchgear units 402, 406 house a MV circuit breaker. In FIG. 4A, the MV circuit breaker 410 in the upper compartment 114 of the switchgear unit 402 experiences an electric arc, causing the resulting gases and debris to be exhausted directly out the upper ventilation flap assembly 146 located on the top surface 144 of the upper compartment 114 in a vertical direction of the arrows shown. An explosion in the adjoining upper compartment 114 of the switchgear unit 406 is also exhausted directly out the corresponding upper ventilation flap assembly 146 located on the top surface 114 of the upper compartment 114 of the second switchgear unit 406 in a vertical direction of the arrows shown. In configurations in which the optional upper blow out panels 120, 122 are present, gases and debris from an electrical arc in the upper compartment 114 is also exhausted out the corresponding blow out panel 120, 122 and out the ventilation flap assemblies 126, 130 of the exhaust unit 104.

FIGS. 5A and 5B are side and front views, respectively, of an exemplary switchgear lineup 500. The switchgear unit 502 includes a bus compartment 512 for carrying one or more busbar conductors 230. Likewise, the switchgear unit 506 also includes a bus compartment 516 for carrying the busbar conductors 230. In this lineup 500, an electric arc 508 is experienced in a bus compartment 512 of the switchgear unit 502 (as shown) or the switchgear unit 506 or in the bus compartment 106 of the exhaust unit 104 that is sandwiched between the switchgear units 502, 506. Regardless of which bus compartment experienced the explosion, the resulting gas and debris is exhausted out into the exhaust unit 104, up the bus compartment 106, and out the ventilation flap assembly 128 on the top of the exhaust unit 104.

Other configurations are contemplated without deviating from the scope of the present invention. For example, the exhaust unit 104 can be integrated into the switchgear unit 102, so long as an insulating barrier (such as a metal panel) is present between the compartment defined by the exhaust unit and the compartments housing the arc-generating equipment. The flaps and blow out panels need not be hinged along a single edge, but rather can be punched out of the side panel to form a perforated panel that is blown out during an explosion. Those skilled in the art will appreciate that the blow out panels or flaps need to be secured to the corresponding surfaces weakly enough that they will open outward during an explosion to relieve the internal pressure within the corresponding compartment. Although the description has focused on medium voltage applications, this invention is equally applicable to low-voltage applications (below 600V).

Aspects of the present disclosure advantageously exhaust gases and debris produced by an electric arc generated inside the switchgear, especially in a lower compartment thereof, to an externally mounted exhaust unit that causes the gases and debris to exhaust in a vertical direction out the top of the exhaust unit. Nearby switchgear units remain unaffected by the explosive effects of an arc fault, and operators standing nearby will not be harmed or injured by the expelled gases or debris, particularly when a vent hood is secured over the top of the ventilation flaps. Thus, when an electric arc occurs, only the affected switchgear unit and exhaust unit needs to be replaced or repaired. There is practically no chance that the gas and debris can exhaust into an adjoining switchgear unit. With respect to the lower compartments, the venting path for gases and debris always includes the exhaust unit externally mounted to the switchgear unit.

The number and configuration of the ventilation flaps can be numerous. Although the ventilation flap assemblies 146, 150 includes two pairs of opposing flaps 152, 154, 156, 158, in other configurations, only one flap or one pair of opposing flaps can be present. The flaps need not be rectangular or square in shape. Conduits, grooves, or other structures can be disposed in the interior of the exhaust unit to direct gases and debris toward the vent flap assemblies.

While particular aspects, embodiments, and applications of the present disclosure have been illustrated and described, it is to be understood that the disclosure is not limited to the precise construction and compositions disclosed herein and that various modifications, changes, and variations may be apparent from the foregoing descriptions without departing from the spirit and scope of the disclosure as defined in the appended claims.

What is claimed is:

1. An exhaust system for exhausting electric arcs within a switchgear, comprising:

a switchgear unit having a lower compartment dimensioned to receive therein a first circuit breaker and an upper compartment dimensioned to receive therein a second circuit breaker, wherein the lower compartment includes a wall panel having a first lower blow out panel for venting gas caused by an electric arc, and wherein the first lower blow out panel is opened away from the lower compartment in response to internal pressure inside the lower compartment generated by an electric arc;

an exhaust unit attached to an exterior of the switchgear unit, the exhaust unit including a bus compartment and a first ventilation flap assembly in a top surface of the exhaust unit such that gas vented from the first lower blow out panel is exhausted in a vertical direction within the exhaust unit out the first ventilation flap assembly in the exhaust unit, wherein the bus compartment is dimensioned to receive therewithin a busbar conductor for carrying current to a protection or measurement device disposed within the lower or upper compartments of the switchgear unit, the exhaust unit further including a second ventilation flap assembly in the top surface of the exhaust unit such that gas produced by an electric arc relative to the busbar conductor is exhausted in a vertical direction within the bus compartment and out the second ventilation flap assembly; and a second switchgear unit having a lower compartment and an upper compartment, wherein the lower compartment of the second switchgear unit includes a wall panel having a second lower blow out panel for venting gas caused by an electric arc, wherein the second lower blow out panel is opened away from the lower compartment of the second switchgear in response to internal pressure inside the lower compartment generated by an electric arc, wherein the second switchgear unit is attached to the exhaust unit such that the exhaust unit is sandwiched between the switchgear unit and the second switchgear unit and such that the busbar conductor extends horizontally from the switchgear unit through the bus compartment of the exhaust unit and into the second switchgear unit.

2. The exhaust system of claim 1, wherein the bus compartment is dimensioned to receive therein at least three busbar conductors, each one for carrying a different phase of electrical current.

3. The exhaust system of claim 1, wherein the bus compartment includes a pair of parallel vertical walls coupled to a base such that the bus compartment has a generally U-shape.

4. The exhaust system of claim 1, wherein the upper compartment includes a first ventilation flap assembly in a top surface of the upper compartment for venting gas caused by an electric arc, wherein the first ventilation flap assembly is opened away from the top surface in response to internal pressure inside the upper compartment generated by an electric arc therein.

5. The exhaust system of claim 4, wherein the first ventilation flap assembly in the top surface of the upper compartment includes a pair of opposing flaps secured to the top surface of the upper compartment at respective edges such that the opposing flaps each open away from one another in response to the internal pressure inside the upper compartment.

6. The exhaust system of claim 1, wherein the wall panel of the switchgear unit includes a first upper blow out panel coinciding with an opening in the upper compartment of the switchgear unit, wherein the first upper blow out panel of the switchgear unit vents gas caused by an electric arc and is opened away from the upper compartment of the switchgear unit in response to internal pressure inside the upper compartment of the switchgear unit generated by said electric arc therein, and wherein the wall panel of the second switchgear unit includes a first upper blow out panel coinciding with an opening in the upper compartment of the second switchgear unit, wherein the first upper blow out panel of the second switchgear unit vents gas caused by an electric arc and is opened away from the upper compartment of the second switchgear unit in response to internal pressure inside the upper compartment of the second switchgear unit generated by the electric arc therein.

7. The exhaust system of claim 6, wherein the wall panel of the switchgear unit further includes a second upper blow out panel coinciding with an opening in the rear compartment, wherein the second upper blow out panel vents gas caused by an electric arc and is opened away from the rear compartment in response to internal pressure inside the rear compartment generated by said electric arc therein.

8. The exhaust system of claim 1, wherein the switchgear unit further includes a rear compartment adjacent to the lower and upper compartments, wherein the rear, lower, and upper compartments are separated from one another by respective insulating barriers, the rear compartment including an opening coinciding with a second lower blow out panel for venting gas caused by an electric arc, wherein the second lower blow out panel is opened away from the rear compartment in response to internal pressure inside the rear compartment generated by an electric arc therein.

9. The exhaust system of claim 8, wherein the rear compartment includes a second ventilation flap assembly in a top surface of the rear compartment for venting gas caused by an electric arc, wherein the second ventilation flap assembly is opened away from the top surface of the rear compartment in response to internal pressure inside the rear compartment generated by an electric arc therein.

10. The exhaust system of claim 9, wherein the second ventilation flap assembly in the top surface of the rear compartment includes a pair of opposing flaps secured to the top surface of the rear compartment at respective edges such that the opposing flaps of the second ventilation flap assembly each open away from one another in response to the internal pressure inside the rear compartment.

11. The exhaust system of claim 8, wherein the wall panel of the switchgear unit further includes a second upper blow out panel coinciding with an opening in the rear compartment, wherein the second upper blow out panel vents gas caused by an electric arc and is opened away from the rear compartment in response to internal pressure inside the rear compartment generated by said electric arc therein.

12. The exhaust system of claim 8, wherein the wall panel of the second switchgear unit further includes a second upper blow out panel coinciding with an opening in the rear compartment of the second switchgear unit, wherein the second upper blow out panel vents gas caused by an electric arc and is opened away from the rear compartment in response to internal pressure inside the rear compartment generated by said electric arc therein.

13. The exhaust system of claim 1, wherein the first lower blow out panel is secured at a bottom edge thereof to the lower compartment such that gas exiting the lower compartment is directed upwards toward the first ventilation flap assembly of the exhaust unit.

14. The exhaust system of claim 1, wherein the first lower blow out panel is secured at a bottom edge thereof to the wall panel such that gas exiting the lower compartment is directed upwards toward the first ventilation flap assembly of the exhaust unit.

15. The exhaust system of claim 1, wherein the first ventilation flap assembly includes a pair of opposing flaps secured to the top surface of the exhaust unit at respective edges such that the opposing flaps each open away from each other in response to the internal pressure.

16. The exhaust system of claim 1, wherein the switchgear unit is rated for medium voltage applications not exceeding 15 kV, and wherein the switchgear unit is a metal-clad switchgear unit.

17. The exhaust system of claim 1, wherein the lower and upper compartments are dimensioned to receive therein a control power transformer rated up to 15 kVA, a current transformer, or a voltage transformer.

18. The exhaust system of claim 1, wherein the switchgear unit includes a bus compartment that abuts against a first side of the bus compartment of the exhaust unit and that receives therein the busbar conductor, and wherein the second switchgear includes a bus compartment that abuts against an opposite side of the bus compartment of the exhaust unit and that receives therein the busbar conductor.

19. An exhaust system for exhausting electric arcs within a switchgear enclosure, comprising:
a plurality of switchgear units, each having a lower compartment dimensioned to receive therein a first circuit breaker and an upper compartment dimensioned to receive therein a second circuit breaker, wherein the lower compartment includes a wall panel having formed therein a first lower blow out panel for venting gas caused by an electric arc, wherein the first lower blow out panel is opened away from the lower compartment in response to internal pressure inside the lower compartment generated by an electric arc therein, wherein the upper compartment includes a first ventilation flap assembly in a top surface of the upper compartment for venting gas caused by an electric arc, wherein the first ventilation flap assembly is opened away from the top surface in response to internal pressure inside the upper compartment generated by an electric arc therein; and
an exhaust unit attached to each of the switchgear units such that the exhaust unit is sandwiched between any two of the switchgear units, the exhaust unit including a first ventilation flap assembly in a top surface of the exhaust unit such that gas vented from the respective first lower blow out panels is exhausted in a vertical direction within the exhaust unit out the first ventilation flap assembly in the exhaust unit, wherein the exhaust unit further includes a bus compartment dimensioned to receive therethrough busbar conductors for carrying electrical current to a protection or measurement device disposed within the lower or upper compartments of the corresponding switchgear units, the exhaust unit further including a second ventilation flap assembly in the top surface of the exhaust unit such that gas produced by an electric arc relative to the busbar conductors is exhausted in a vertical direction within the bus compartment and out the second ventilation flap assembly.

* * * * *